(12) United States Patent
Hashiguchi (10) Patent No.: US 6,340,444 B1
(45) Date of Patent: Jan. 22, 2002

(54) HEAT TREATMENT APPARATUS

(75) Inventor: Akihiro Hashiguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/551,316

(22) Filed: Apr. 18, 2000

(30) Foreign Application Priority Data

Apr. 23, 1999 (JP) .......................................... 11-117036
May 11, 1999 (JP) .......................................... 11-130159

(51) Int. Cl.$^7$ .............................................. C21D 11/00

(52) U.S. Cl. ........................... 266/87; 266/103; 432/43; 432/59

(58) Field of Search ................................ 266/102, 103, 266/99, 87; 432/43, 59

(56) References Cited

U.S. PATENT DOCUMENTS 5,693,243 A * 12/1997 Kueppers et al. ............ 219/216
5,875,416 A *  2/1999 Kanno ......................... 702/130

* cited by examiner

*Primary Examiner*—Scott Kastler
(74) *Attorney, Agent, or Firm*—Sughrue Mion, PLLC (57) ABSTRACT

A heat treatment apparatus includes rollers that slide and move an image recording sheet on the surface of a heating member while pressing at least a portion of the sheet against the surface of the heating member. The temperature of a dummy unit, provided at a position adjacent to the rollers, is measured by a temperature sensor. The measured temperature has a relationship with a change in the temperature of the rollers. Temperature control is performed based on the measured temperature in order to adjust the temperature of the rollers. A cushion disposed on a surface of the heating member is arranged to moderate the pressure which is exerted by the rollers on the sheet. A pulling mechanism provides a tension to the cushion, which is detachable from the heating member.

20 Claims, 7 Drawing Sheets

HEAT TREATMENT APPARATUS

BACKGROUND OF THE INVENTION

The present invention relates to a heat treatment apparatus for performing heat treatment of a sheet which must be treated, and more particularly to a heat treatment apparatus for use to, with heat, develop a material having an image formed thereon in a dry system which does not require a wet process and which uses a dry material.

The wet system has been employed in, for example, an image recording apparatus for printing a plate, a digital radiography system arranged to use a heat accumulative fluorescent sheet, and an image recording apparatus for recording an image for medical use, such as CT or MR. The wet system is arranged to photograph or record an image on a silver-salt photosensitive material, followed by performing a wet process so as to obtain an image.

On the other hand, a different recording apparatus has attracted attention. The recording apparatus employs a dry system which does not require the wet process. In the recording apparatus of the dry type, a photosensitive and/or a thermal recording material (a thermal and photosensitive recording material) or a film (hereinafter called a "recording material) constituted by a thermal development photosensitive material is employed. The recording apparatus using the dry system incorporates an exposing portion for irradiating (scanning) the recording material with a laser beam to form a latent image. Then, a thermal development portion of the system brings the recording material into contact with a heat means to perform thermal development. Then, the recording material having an image formed thereon is discharged to the outside of the apparatus.

The dry system is able to form an image in a shorter time as compared with the wet process. Moreover, the necessity for disposing waste solution required of the wet process can be overcome. Therefore, increase in the demand for the dry system has been expected.

A portion of the foregoing conventional dry system has a structure that the heat development portion incorporates, for example, a heating means and a pressing/moving means to hold and move the recording material by the heating means and the pressing/moving means so as to perform heat development. That is, the recording material is heated to a predetermined temperature so as to be developed with heat when the recording material is held and moved between the heating means and the pressing/moving means. If the recording material cannot be heated sufficiently at this time, uneven development occurs. Since the recording material for dot printing has high sensitivity because a dot image for printing must have excellent image quality, the image quality considerably deteriorates if heating cannot be performed to the predetermined temperature. It leads to a fact that a temperature sensor has been provided for the heating means so as to accurately control the temperature in accordance with the temperature detected directly.

The heating apparatus has an inspection cover which is sometimes opened and closed owing to occurrence of a jam or the like. Thus, the heat development portion is cooled to the outside air temperature. In the foregoing case, the temperature is lower than the predetermined temperature for some time even after the inspection cover has been closed. It leads to a fact that the heating means incorporating the provided temperature detection sensor directly detects the decrease in the temperature. Therefore, the temperature can relatively quickly be returned to the predetermined temperature. On the other hand, the other members in the heat development portion except for the heating means are returned to the predetermined temperature at individual raising rate. Therefore, when the temperature is again raised after interruption of heating, the temperatures of members which concern the heat development must accurately be detected. Moreover, control must be performed such that the temperatures of the members are returned to the predetermined temperature.

The pressing/moving means which is brought into contact with the recording material in a direct manner exerts a great influence of the temperature thereof on the development temperature. To maintain frictional force with the recording material, the pressing/moving means is coated with a silicon rubber or the like. Therefore, temperature sensor cannot directly be brought into contact with the pressing/moving means. Thus, the temperature of the pressing/moving means cannot be detected. Hence it follows that there is a requirement for detecting the temperature of the pressing/moving means to realize more accurate control of the temperature in the heat development portion.

In the dry system, the thermal development portion is usually provided with a heat drum which serves as a heating means. An endless belt is wound around the heating drum for a predetermined angle. Thus, the heating drum and the endless belt are used to hold and move the recording material to perform the heat development. If the endless belt cannot maintain uniform tension, required contact between the recording material and the heating drum cannot be established. Thus, uneven development occurs.

Since a dot image which must be printed is required to have excellent image quality, the sensitivity of the recording material has greatly been improved. Therefore, unsatisfactory contact with the heating drum encounters excessive deterioration of the image quality.

The heating means encounters a problem in that the temperature is decreased at an end portion to which heat cannot sufficiently be supplied. Moreover, the heating means suffers from undesirable bending and occurrence of a wrinkle caused from buckling of an end portion of the recording material which takes place when the recording material is held between the heating drum and the endless belt. The wrinkle becomes conspicuous in a case where a recording material (for example, a recording material for making a plate for a newspaper) of a type having a large size and great thickness is used.

SUMMARY OF THE INVENTION

An object of the invention is to enable more accurately control of the temperature of a heat development portion to be performed by employing a structure which is capable of detecting the temperature of the pressing/moving means.

Another object of the present invention is to provide a heat treatment apparatus which is capable of making the contact between the heating member and a recording material to furthermore be uniform, preventing occurrence of a wrinkle, realizing furthermore uniform heating and therefore capable of forming an image exhibiting high quality free from uneven development.

A heat treatment apparatus according to the present invention comprises:

a heating member which subjects a sheet to a heating process at a predetermined temperature;

moving means which moves the sheet;

a temperature-measured member, the temperature of which is measured and changed with a relationship with change in the temperature of the moving means and which is provided at a position adjacent to the moving means;

a temperature sensor disposed in contact with the temperature-measured member so as to measure the temperature of said temperature-measured member; and temperature control means which controls the temperature of the moving means in accordance with a result of detection of the temperature performed by the temperature sensor.

The heat treatment apparatus incorporates the temperature sensor with which the temperature of the temperature-measured member is measured. The detected temperature is corrected in accordance with the relationship between change in temperature of the moving means and a change of a temperature of the temperature-measured member. Therefore, the temperature of the moving means which cannot be detected by the conventional technique because direct contact has been inhibited can be detected. It leads to a fact that accurate control of heating corresponding to the detected temperature of the moving means can be performed. Therefore, a predetermined temperature of the moving means can be maintained. If the temperature of the moving means is changed, the temperature can quickly be restored to the original temperature.

A heat treatment apparatus according to the present invention has a structure that the moving means is structured by coating the outer surface of a roller with an elastic member having a predetermined thickness, the temperature-measured member is structured by coating with an elastic member constituted by the same material as the material of the elastic member with substantially the same thickness, and the temperature sensor is disposed in contact with the surface of the elastic member of the member, the temperature of which is measured.

The heat treatment apparatus has the structure that the member, the temperature of which is measured, is composed of the same component as the component of the moving means. Therefore, change in the temperature of the heating drum is made to approximate change in the temperature of the moving means. As a result, the difference between the temperature obtainable from the temperature-measured member and the actual temperature of the moving means can be reduced. Hence it follows that the estimated temperature of the moving means can accurately be detected.

A heat treatment apparatus according to the present invention has a structure that the moving means is a pressing/moving means which slides and moves the sheet on the surface of the heating member while pressing at least a portion of the sheet against the surface of said heating member.

Since pressing/moving means of this heat treatment apparatus slides and moves the sheet on the surface of the heating member while pressing at least a portion of the sheet against the surface of said heating member, the wrinkle which occurs in the sheet A is prevented.

To achieve the foregoing object, according to one aspect of the invention, there is provided a heat treatment apparatus comprising:

a heating member for subjecting a sheet to a heating process at a predetermined temperature at a predetermined position;

a pressing/moving means for sliding and moving the sheet on the surface of the heating member while pressing at least a portion of the sheet against the surface of the heating member; and a cushion member provided for the surface of the heating member and arranged to moderate the pressure which is exerted from the pressing/moving means on the sheet.

In the heat treatment apparatus, when the sheet which has been introduced into a space between the cushion member and the pressing/moving means is pressed by the pressing/moving means, the cushion member is elastically deformed. Thus, deformation of the sheet is permitted. Moreover, reaction from the cushion member is exerted on the sheet. It leads to a fact that a partial tension is given to the sheet. As a result, a wrinkle is formed in the sheet can positively be removed.

A heat treatment apparatus according to the present invention further comprises a pulling means for giving a tension to the cushion member.

In the heat treatment apparatus, the cushion member is pulled by the pulling means so that a tension is always exerted on the cushion member. Therefore, if the relative position between the heating member and the cushion member is deviated owing to the difference in the coefficient of thermal expansion, occurrence of a wrinkle can be prevented.

A heat treatment apparatus according to the present invention has a structure that the cushion member is detachable from the heating member.

The heat treatment apparatus according to the present invention incorporates the cushion member which is detachable from the heating member. Therefore, if fatigue of the cushion member occurs, employment of a new cushion member permits the function capable of moderating the pressure of the pressing/moving means to permanently be maintained.

A heat treatment apparatus according to the present invention has a structure that the cushion member is a fiber sheet constituted by gathering fine thread materials.

The heat treatment apparatus according to the present invention has the structure that the cushion member is a fiber sheet constituted by gathering fine thread materials. Therefore, for example, employment of the following fibers is permitted: natural fibers (including vegetable fibers, animal fibers and mineral fibers) and chemical fibers (including regenerated fibers, semi-synthetic fibers, synthetic fibers and inorganic fibers). Therefore, the material can widely be selected to satisfy required low-friction, heat resistance, elasticity and low cost.

A heat treatment apparatus according to the present invention further comprises a sub-heating member disposed opposite to the heating member across the moving means.

The heat treatment apparatus further comprises the sub-heating member disposed opposite to the heating member across the moving means. Thus, the difference between the temperature of the right side and the temperature of the reverse side of the sheet can be reduced. Thus, the sheet can furthermore uniformly be heated. As a result, uneven development can be prevented.

DETAILED DESCRIPTION OF THE PREFERRED EMBODIMENT

Embodiments of a heat treatment apparatus according to the present invention will now be described with reference to the drawings.

(First Embodiment)

Figure 1:
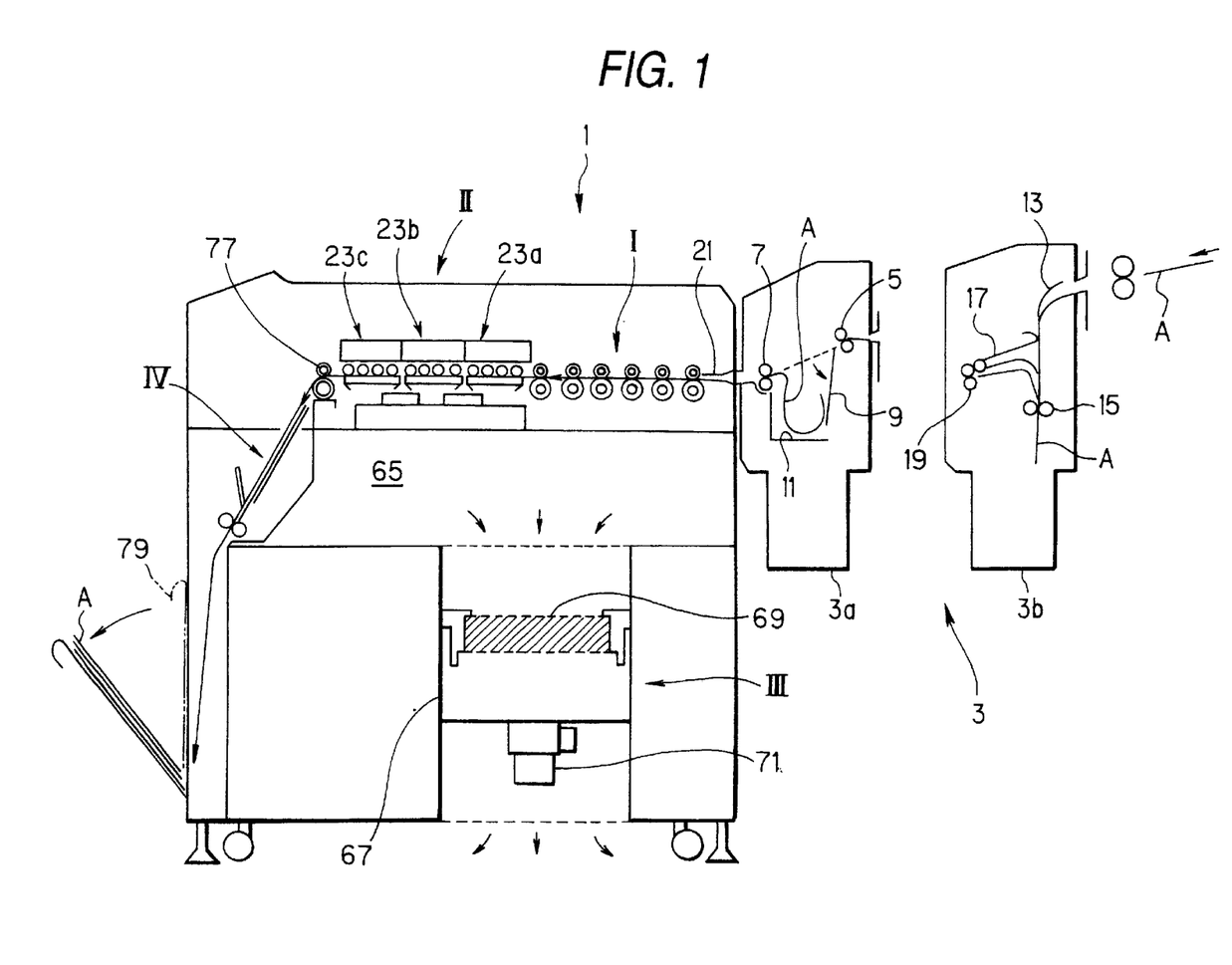
FIG. 1 is a schematic view showing the structure of a first embodiment of a heat treatment apparatus according to the present invention.

FIG. 1 is a schematic view showing the structure of a first embodiment of the heat treatment apparatus according to the present invention.

The heat treatment apparatus 1 heats a sheet A which must be heated (hereinafter abbreviated as "sheet"). The sheet A is, for example, a recording material for making a plate, the recording material having a large size and a small thickness. Specifically, a photosensitive material which is developed with heat and which has been disclosed by the applicant of the present invention in Japanese Patent Application No. 11-41280. The foregoing photosensitive material which is developed with heat incorporates an image forming layer formed on a support member and at least containing (a) non-photosensitive organic silver salt, (b) photosensitive halogenated silver, (c) a reducing agent and (d) a core producing agent, wherein the image forming layer incorporates a binder, the 50 wt % or more of which is latex of a polymer having a glass transition temperature of not lower than −30° C. nor higher than 40° C., the image forming layer is applied to the surface of the support member, the image forming layer is dried, and the photosensitive material which is developed with heat is treated with heat at a temperature with which the surface of the film is heated to a temperature not lower than 30° C. and nor higher than 70° C. and which is not higher than the glass transition point of the support member. The heat treatment apparatus 1 comprises a pre-heating portion I, a development portion II, an air discharge portion III and a gradually-cooling portion IV.

A conveyor 3 serving as an interface for supplying, to the heat treatment apparatus 1, the sheet A exposed and scanned by a plotter (not shown) and having a latent image is connected to the heat treatment apparatus 1. The conveyor 3 is a conveyor 3a capable of using both of A1-size/A2-size sheets A and reducing and adjusting the sheet supply speed from the plotter; or a conveyor 3b arranged to use only the A2-size sheet and capable of turning the sheet A upside down. Either of the conveyor 3a or the conveyor 3b is connected to the heat treatment apparatus 1 to meet the purpose.

The conveyor 3 will schematically be described. The conveyor 3a incorporates an inlet nip roller 5 which is rotated in synchronization with the sheet conveying speed of the plotter; and an outlet nip roller 7, the rotating speed of which is lower than that of the inlet nip roller 5 and which is rotated in synchronization with the sheet conveying speed of the heat treatment apparatus 1. Moreover, a guide plate 9 which is able to swing downwards is disposed in a conveyance passage formed between the inlet nip roller 5 and the outlet nip roller 7. In the conveyor 3a, the guide plate 9 swings downwards when the sheet A conveyed by the inlet nip roller 5 has reached the outlet nip roller 7 and held by the same. Thus, the sheet A is formed into a loop shape so as to be deflected in an accommodating portion 11. As a result, the difference between the conveying speed of the heat treatment apparatus 1 and that of the plotter can be absorbed.

The conveyor 3b incorporates a vertical guide portion 13 for substantially downwards conveying the sheet A supplied from the plotter; an inversion nip roller 15 disposed at the lower end of the vertical guide portion 13; a horizontal guide portion 17 connected to a substantially central portion of the vertical guide portion 13; and an outlet nip roller 19. The conveyor 3b causes the vertical guide portion 13 to bend the sheet A supplied from the plotter. Thus, the sheet A is conveyed in the downward direction by the inversion nip roller 15. When the trailing end of the sheet A has reached a predetermined height, the sheet A is supplied from the vertical guide portion 13 owing to the dead weight thereof. Then, the sheet A falls to the horizontal guide portion 17. The inversion nip roller 15 is inversely rotated in the foregoing state so that the sheet A is conveyed along the horizontal guide portion 17. When the sheet A has been sandwiched by the outlet nip roller 19, the sheet A is turned upside down. Then, the sheet A is supplied to the heat treatment apparatus 1.

The sheet A, the conveying speed of which has been adjusted or which has been inverted, by the conveyor 3 is supplied through the sheet supply opening 21 of the heat treatment apparatus 1. Initially, the sheet a passes through the pre-heating portion I. The pre-heating portion I is constituted by a plurality of pairwise nip rollers which are heat rollers and arranged to heat the sheet A so as to raise the temperature of the sheet A to a heat development temperature.

Figure 2:
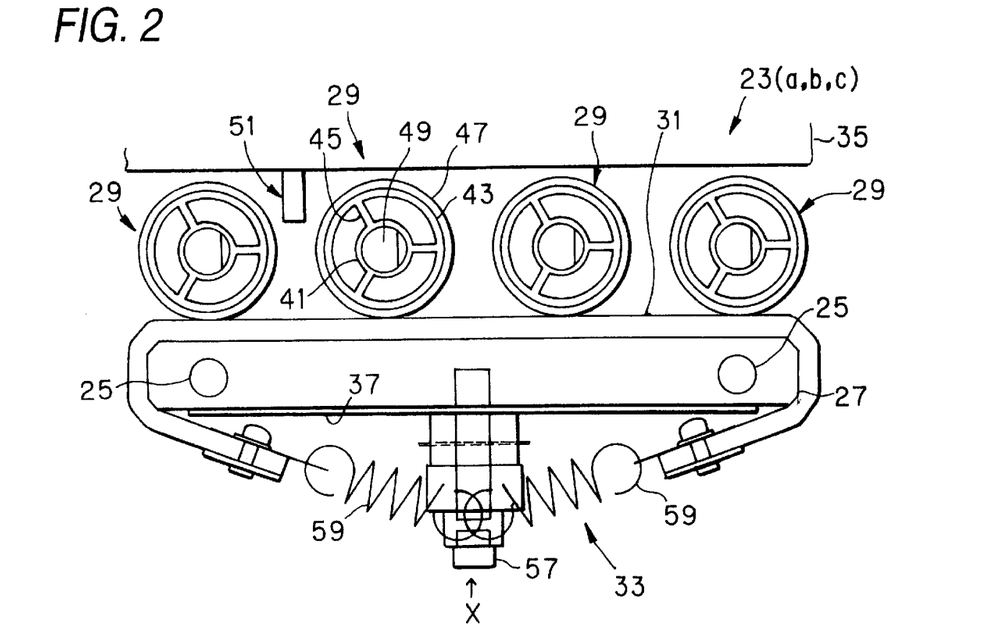
FIG. 2 is an enlarged view showing a development portion of the heat treatment apparatus according to the first embodiment.

The sheet A heated to the heat development temperature by the pre-heating portion I is conveyed to the development portion II. The development portion II according to this embodiment incorporates three units 23a, 23b and 23c each having the same shape and disposed in the sheet conveying direction. As shown in FIG. 2, each of the units 23a, 23b and 23c incorporates a heat plate 27 which is a heating member supported by support shafts 25; rollers 29 which are pressing/moving means for sliding and moving the sheet A while pressing the sheet A against the surface of the heat plate 27; a cushion member 31 provided for the surface of the heat plate 27 and arranged to moderate the pressure of the roller 29 which is exerted on the sheet A; a pulling means 33 for exerting a tension on the cushion member 31; and a sub-heating member 35 disposed opposite to the heat plate 27 across the rollers 29.

The heat plate 27 according to this embodiment is a plate heater formed into a plate-like shape. The heat plate 27 has a surface which is brought into contact with the sheet A and which is simply constituted by a heat conductive material. Moreover, the heat plate 27 incorporates a rubber heater 37 bonded to the reverse side thereof. Thus, the heat plate 27 is able to heat the sheet A in such a manner that the development temperature can be maintained. The heat plate 27 may be a plate-like heating member accommodating a heating member, such as a nichrome wire, laid into a plane configuration. As an alternative to this, the heat plate 27 may be a member, such as a ceramic heater, which generates heat. Another member may be employed which indirectly heats a heat conductive member by using heat convection from a heat source. A member may be employed which incorporates a halogen-lamp heater which radiates heat to transmit heat.

It is preferable that the heat distribution of the heat plate 27 which is the heating member has a gradient of the temperature in such a manner that the temperatures of two ends of the heat plate 27 are higher than those of the other portions to prevent decrease in the temperatures of the two ends caused by radiation of heat. To improve heat conduction to the sheet A, it is preferable that a high heat-conductive material, such as metal (for example, aluminum) exhibiting high heat-conduction is employed as the heat conductive member. It is preferable that the heat conductivity satisfies a range from 1 W/m/° C. to 400 W/m/° C., more preferably from 10 W/m/° C. to 400 W/m/° C.

To prevent decrease in the temperature of the heat plate 27 when the sheet A is subjected to the heat treatment, and in particular, when a repeated process is performed, the quantity of heat supplied from the heat plate 27 must be enlarged. It is preferable that the thermal capacity of the heat plate 27 is varied in the conveying direction of the sheet A in consideration of the thermal efficiency. Since the sheet A, the temperature of which is lower than the heating temperature, is usually conveyed, heat exchange with the sheet A is greater in the sheet inlet portion of the heat plate 27. Therefore, enlargement of the thermal capacity of the sheet inlet portion of the heat plate 27 is effective in preventing change in the temperature of the heat plate 27.

In this embodiment, four rollers 29 are provided for one heater unit and disposed in contact with either side of the heat plate 27 through the cushion member 31. Note that the number of the rollers 29 may be varied to correspond to the purpose. The rollers 29 incorporates an inner ring 41 and an outer ring 43 connected to each other by ribs 45. A silicon rubber 47 is bonded to the outer surface of the outer ring 43. It is preferable that the heat conductivity of the rollers 29 satisfies a range from 0.1 W/m/° C. to 200 W/m/° C. The rollers 29 is rotatively supported at a predetermined position owing to insertion of fixing shafts 49 into the two ends of the inner ring 41. Since the rollers 29 have a coefficient of friction higher than that of the surface of the cushion member 31 with respect to the sheet A, the rollers 29 are able to reliably convey the sheet A.

Specifically, each of the rollers 29 incorporates ribs 45 constituted by, for example, aluminum, and silicon rubber 47 having a hardness of 30°, a thickness of 1.5 mm and a rough surface. Each of the rollers 29 is structured such that the nipping force is 1 gf/mm, the conveying speed is 20 mm/sec and the conveying force is 3 kgf or greater. The rollers 29 are disposed along the heat plate 27 at predetermined pitches in the sheet conveying direction so as to form a sheet conveying passage together with the heat plate 27.

When the leading end of the sheet A is brought into contact with the roller 29 during conveyance of the sheet A, the movement of the sheet A is interrupted. When the rollers 29 are separated from one another at the same pitches, the same portion of the sheet A is stopped at each of the rollers 29. Thus, the portion is pressed against the heat plate 27 for a long time. As a result, uneven development of the sheet A in the line shape extending in the widthwise direction occurs. Therefore, it is preferable that the pitches of the rollers 29 are made to be non-uniform.

The development portion II according to this embodiment has a sub-heating member 35 provided for each heat plate 27 across the rollers 29. In the development portion II, 60% to 70% of the overall quantity of heat which must be supplied is shared by the heat plate 27. About 30% to 40% of the overall quantity of heat which is supplied is shared by the sub-heating member 35. The temperature change of the rolls 29 follows a temperature field around the rolls, which is heated by the heat plate 27 and the sub-heating member 35. Since the sub-heating member 35 is disposed opposite to the heat plate 27 across the rollers 29, difference in the temperature between the right side and the reverse side of the sheet A can be reduced. Thus, the sheet A can uniformly be heated, causing occurrence of uneven development to be prevented. In this embodiment, the sub-heating member 35 is disposed in non-contact with the rollers 29. The heating structure may be a heat plate method with which a heating member, such as a nichrome member, is laid into a planar shape and accommodated, an air supply method using hot air or a radiation method using a halogen lamp to serve as a heat source.

Figure 3:
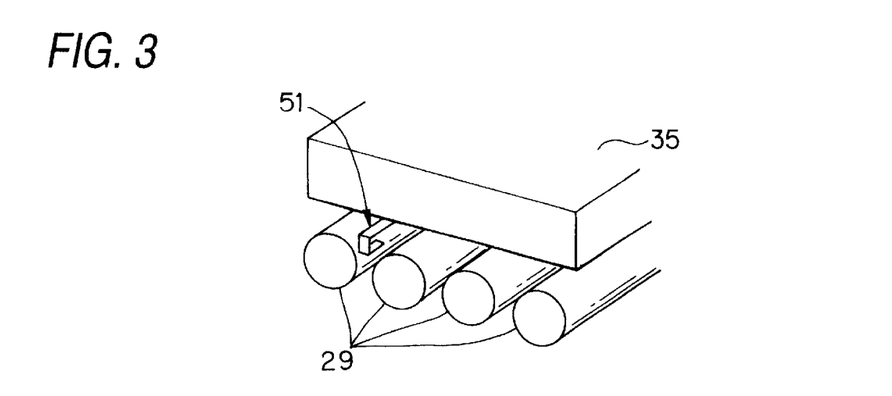
FIG. 3 is a perspective view showing the side portion of the development portion to which a dummy unit is secured according to the first embodiment.
Figure 4:
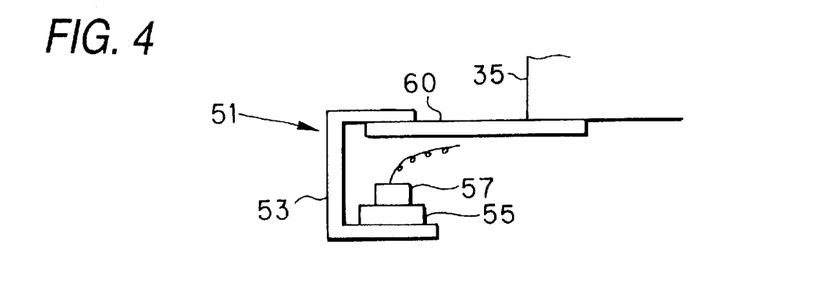
FIG. 4 is a schematic view showing the dummy unit according to the first embodiment.

As shown in FIG. 3, a dummy unit 51 is joined to the side portion of the sub-heating member 35. In this embodiment, the dummy unit 51 is joined to any one of the three units 23a, 23b and 23c. As shown in FIG. 4, the dummy unit 51 incorporates a supporting member 53, a silicon rubber plate 55 which is an elastic member as a member, the temperature of which is measured, secured to the surface of the supporting member 53 and a temperature sensor 57. For example, PT5S-312 series or PT5S-342 series (made by Shibaura Densi Seisakusho) is used as the temperature sensor 57.

The supporting member 53 is made of the same metal as that of the outer ring 43. The silicon rubber plate 155 is constituted by silicon rubber having substantially the same thickness as that of the silicon rubber 47 applied to the outer ring 43. The temperature sensor 57 is joined in contact with the surface of the silicon rubber plate 55 to be capable of detecting the surface temperature of the silicon rubber plate 55.

The dummy unit 51 is supported by the sub-heating member 35 through a support arm 60 constituted by a material having great heat resistance to prevent direct conduction of heat from the sub-heating member 35. Thus, the temperature of the silicon rubber plate 55 is made to be substantially the same as the temperature of the silicon rubber 47 of the rollers 29 in the development portion II. That is, the conduction caused from heat conduction, heat convection and heat radiation are substantially the same between the silicon rubber plate 55 and the silicon rubber 47 of the rollers 29. Since similar heat conduction systems are constituted in the same temperature field, change in the temperature of the silicon rubber 47 which is a member comprised by the rollers 29 and that of the silicon rubber plate 55 as a member, the temperature of which is measure have a relationship.

The relationship about the temperature is detected prior to performing the heat development. Thus, the temperature of each of the rollers 29 can accurately be estimated in accordance with the temperature detected by the temperature sensor 57 of the dummy unit 51. As a result, the temperature of the rollers 29 can be detected. That is, the temperature of the rollers 29 can be detected without any necessity for the contact with the rollers 29.

The inside portion of the pre-heating portion I is sectioned into the pre-heating portion I and the development portion II formed into chambers. The chamber portion 65 has an air suction portion (not shown) allowed to communicate with the outside. An air discharge passage 67 allowed to communicate with the outside is connected to the chamber portion 65. The air discharge passage 67 has a deodrizing filter 69 and an air discharge fan 71 sequentially mounted from the inside portion of the chamber portion 65.

Gas generated in the pre-heating portion I and the development portion II is sucked from the chamber portion 65 into the air discharge passage 67 so as to be cleaned owing to passing through the deodrizing filter 69. Then, the gas is discharged to the outside of the heat treatment apparatus 1.

The filter may be constituted by any one of the following structures:

Heat Conductive Condensation Accumulator: metal mesh or the like;

Non-Heat-Conductive Condensation Accumulator: sponge, paper, cloth or unwoven fabric Fine-Grain Filter: same as above;

Absorbing Block
 (i) fine-grain filter: activated carbon, ceramic powder or the like;
 (ii) bonding-particle filter: a structure obtained by bonding activated carbon or a structure obtained by solidifying ceramic powder;
 (iii) chemical filter.

Electrostatic Filter: a sucking structure using adsorbing force of static electricity.

The foregoing filters are combined with each other into the following structures (a) to (m):
 (a) conductive condensation accumulator+fine grain filter+absorbing block;
 (b) non-conductive condensation accumulator+fine grain filter+absorbing block;
 (c) only fine grain filter+absorbing block;
 (d) conductive condensation accumulator+absorbing block;
 (e) fine grain filter+absorbing block;
 (f) conductive condensation accumulator+fine grain filter;
 (g) only conductive condensation accumulator;
 (h) only non-conductive condensation accumulator;
 (i) only fine grain filter;
 (j) only absorbing block;
 (k) conductive condensation accumulator+electrostatic filter;
 (l) non-conductive condensation accumulator+electrostatic filter; and
 (m) only electrostatic filter.

Figure 5:
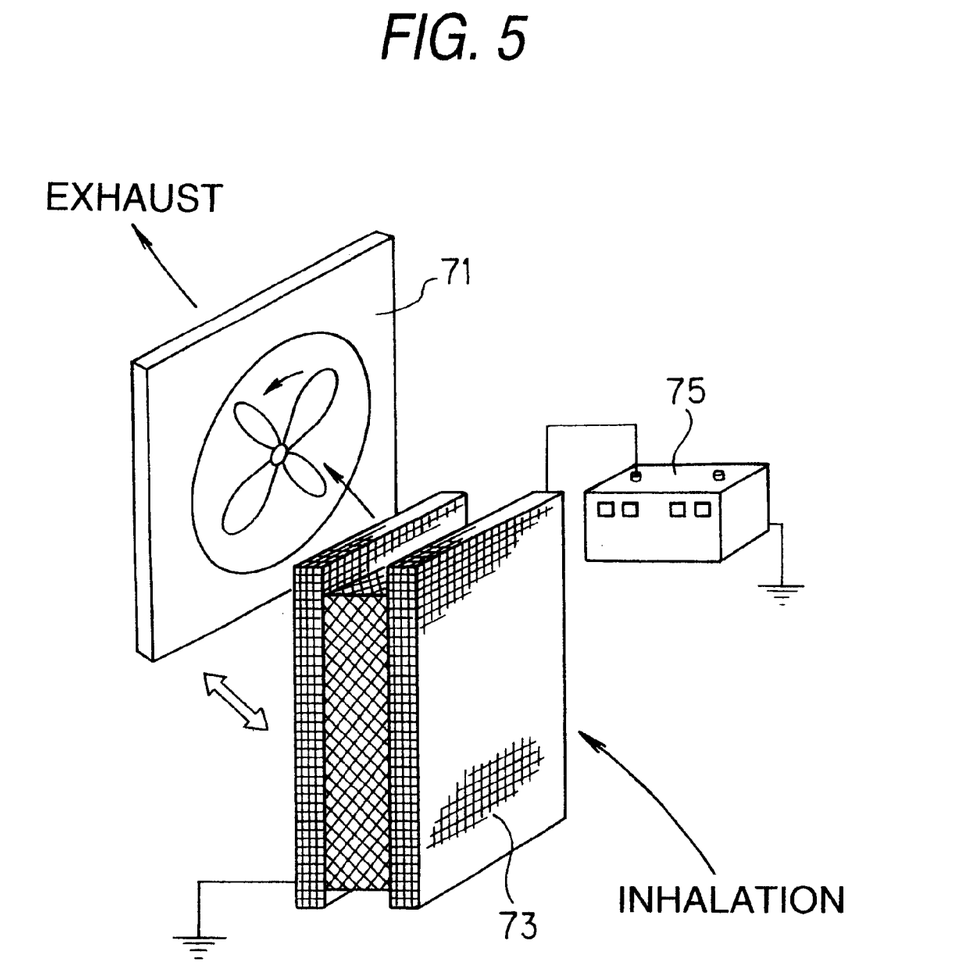
FIG. 5 is a schematic view showing a filter provided for a gas discharge portion.

FIG. 5 is a schematic view showing the (k) conductive condensation accumulator+electrostatic filter which are included in the heat treatment apparatus according to the present invention.

A high-voltage power source 75 is connected to a filter 73 constituted by a metal net or the like. Ions generated by high voltage capture fine particles and the like to discharge the captured fine particles and the like to the outside of the apparatus by the air discharge fan 71.

The gradually-cooling portion IV is disposed at a downstream position from the development portion II in the sheet conveying direction. The sheet A is subjected to the heat development process in the development portion II, and then the sheet A is conveyed to the gradually-cooling portion IV by the nip roller 77 so as to be cooled. The sheet A subjected to the heat development is discharged through the discharge opening so as to be accumulated on a film receiving tray 79 disposed on the outside of the heat treatment apparatus 1.

The operations of the silicon rubber plate 55 and the temperature sensor 57 provided for the heat treatment apparatus 1 according to this embodiment will now be described.

When an inspection cover of the heat treatment apparatus 1 having the above-mentioned structure has been opened/closed owing to occurrence of a jam or the like, the development portion II is exposed to the outside air. Even after the inspection cover 81 has been closed, the temperature is lower than a predetermined level.

In the foregoing case, decrease in the temperature of the heat plate 27 can directly be detected by the provided temperature sensor (not shown). A control unit (not shown) serving as a temperature control unit performs control to heat the heat plate 27. Thus, the temperature can relatively quickly be restored to the predetermined level. Simultaneously with the control to heat the heat plate 27, the control unit causes the temperature sensor 157 to detect the temperature of the silicon rubber plate 55. The control unit corrects the detected value in accordance with the relationship between the temperature of the silicon rubber 47 of the rollers 29 and silicon rubber plate 55 to obtain an estimated temperature of the rollers 29. When the temperature of silicon rubber plate 55 is, for example, 110°, an estimation is performed such that the temperature of the rollers 29 is 115° C. In accordance with the estimated temperature of the rollers 29, the control unit sets an aimed temperature for each of the heat plate 27 and the sub-heating member 35 to cause the temperature of the rollers 29 to be a required set temperature. Thus the control unit performs control of heating. As a result, the temperature of the development portion II can accurately be restored to the predetermined level. Hence it follows that the cooled development portion II can quickly be restored to the predetermined level.

As described above, the heat treatment apparatus 1 operates the temperature sensor 157 to detect the temperature of the silicon rubber plate 55. The detected temperature is corrected in accordance with the detected relationship between change in the temperature of the silicon rubber 47 of the rollers 29 and change in the temperature of the silicon rubber plate 55. Therefore, the temperature of the rollers 29, which cannot directly be measured by the conventional technique, can be detected.

The heat treatment apparatus 1 incorporates the dummy unit 51 which is made of the same element as that of the rollers 29. Therefore, change in the temperature of the silicon rubber plate 55 approximates change in the temperature of the rollers 29. Therefore, the difference between the temperature obtainable from the dummy unit 51 and the actual temperature of the rollers 29 can be reduced. Therefore, a more accurate estimated temperature of the rollers 29 can be obtained.

In accordance with the obtained estimated temperature of the rollers 29, heating is controlled. Thus, the temperature of the development portion II can quickly and accurately be restored to a predetermined level. As a result, smooth development process exhibiting high quality can be performed.

(Second Embodiment)

Next, the second embodiment of the heat treatment apparatus according to the present invention will be described.

Figure 6:
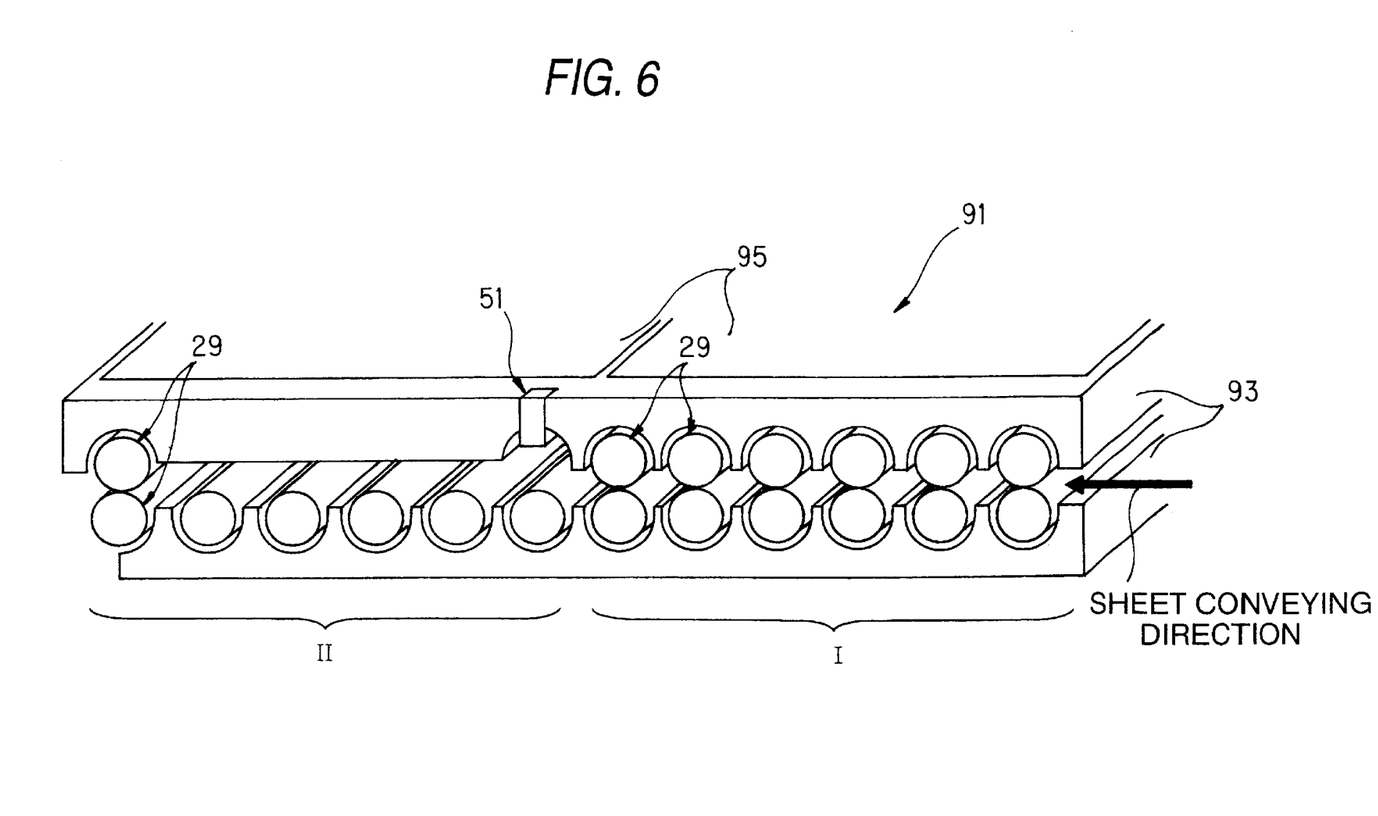
FIG. 6 is a perspective view showing the development portion according to the second embodiment.
Figure 7:
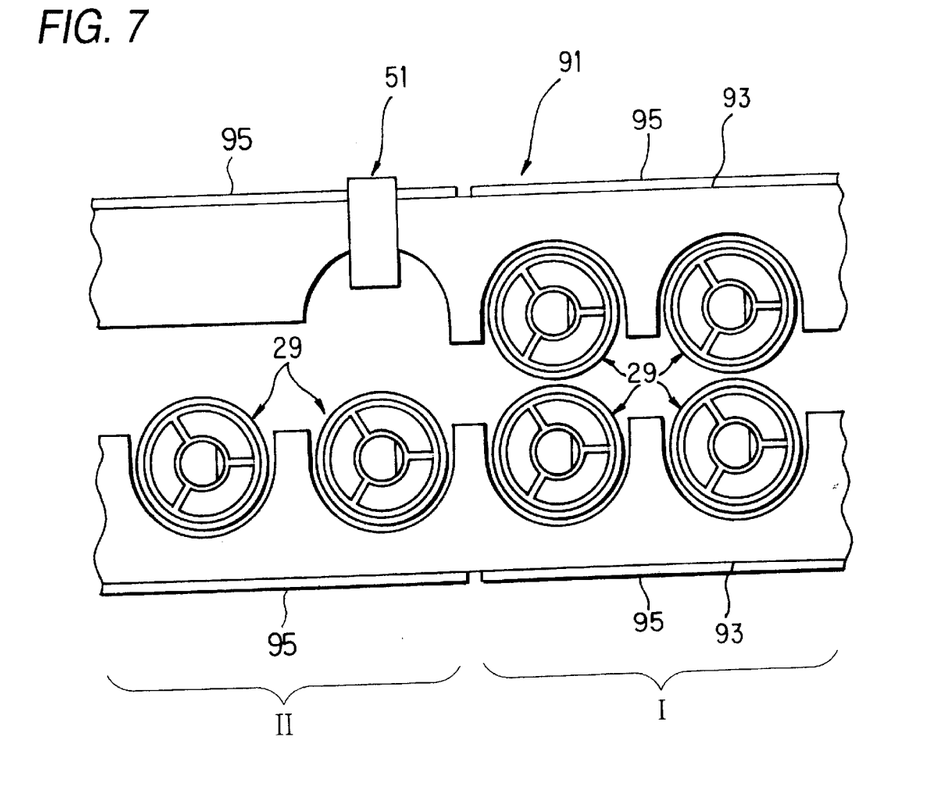
FIG. 7 is an enlarged view showing an essential portion of the development portion according to the second embodiment.

FIG. 6 is a perspective view showing the development portion, FIG. 7 is an enlarged view showing an essential portion thereof according to the second embodiment. The description of the same element as the first embodiment is omitted and the element is numbered the same reference as the first embodiment.

As shown in FIG. 6, a pre-heating/development portion 91 comprises a pre-heating portion I and a development portion II. At the pre-heating portion I, a plurality of pairs of rollers 29 is provided, which nips the sheet A by the force from upward and downward, and which moves the sheet A in the sheet conveying direction (left, in FIG. 6). At the development portion II, rollers 29 are provided only on the bottom except for the rollers at an exit. A heating member 93 is provided as the rollers 29 are put therein.

As shown in FIG. 6 and FIG. 7, a plurality of groove is provided parallel with each other, which covers substantially a half of circumference of the rollers 29 on the heating member 93. The upper rollers are movable in the direction of vertical, then sheet A is nipped owing to the own weight of the upper rollers.

Note that the number of the rollers 29 and disposition thereof may be varied to correspond to the purpose. The components of the rollers 29 (the inner ring 41, the outer ring 43, the ribs 45, the silicon rubber 47, etc . . . ) is similar to first embodiment.

A high heat-conductive material, aluminum for example, is employed as a material of the heating member 93. Moreover, the heating member 93 incorporates a rubber heater 95 bonded to the surface thereof not to face the rollers 29. Thus, the heating member 93 is able to heat the sheet A in such a manner that the development temperature can be maintained. The heating member 93 may be a plate-like heating member accommodating a heating member, such as a nichrome wire, laid into a plane configuration. As an alternative to this, the heating member 93 may be a member, such as a ceramic heater, which generates heat. Another member may be employed which indirectly heats a heat conductive member by using heat convection from a heat source. A member may be employed which incorporates a halogen-lamp heater which radiates heat to transmit heat.

In this embodiment, the sub-heating member 35 is disposed in non-contact with the rollers 29.

In the second embodiment, a dummy unit has the similar structure and function to the dummy unit of the first embodiment is provided.

As shown in FIG. 6 and FIG. 7, the dummy unit 51 is disposed at the vicinity of border of the units which are pre-heating unit I and development unit II, concave portion of upward heating member 93 for example. Details are omitted because it is similar to first embodiment.

(Third Embodiment)

Nest, the third embodiment of the heat treatment apparatus according to the present invention will be described.

Figure 8:
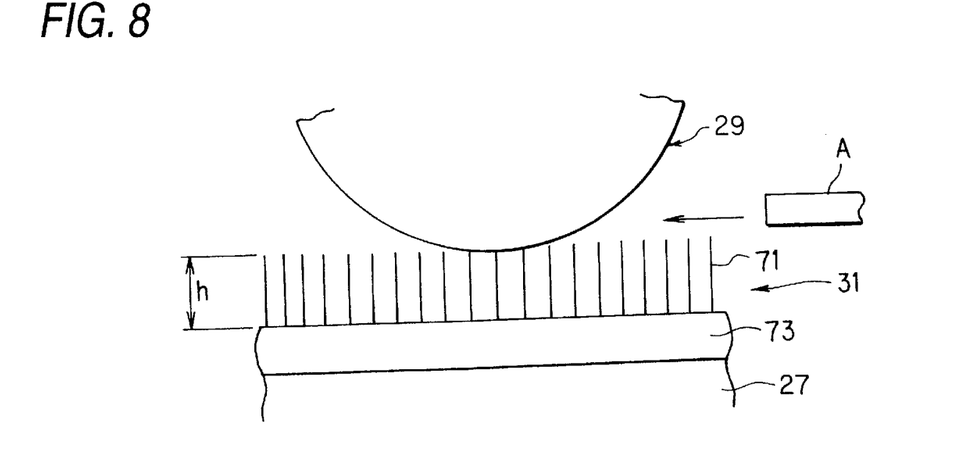
FIG. 8 is an enlarged view showing an essential portion of a cushion member according to the third embodiment.
Figure 9:
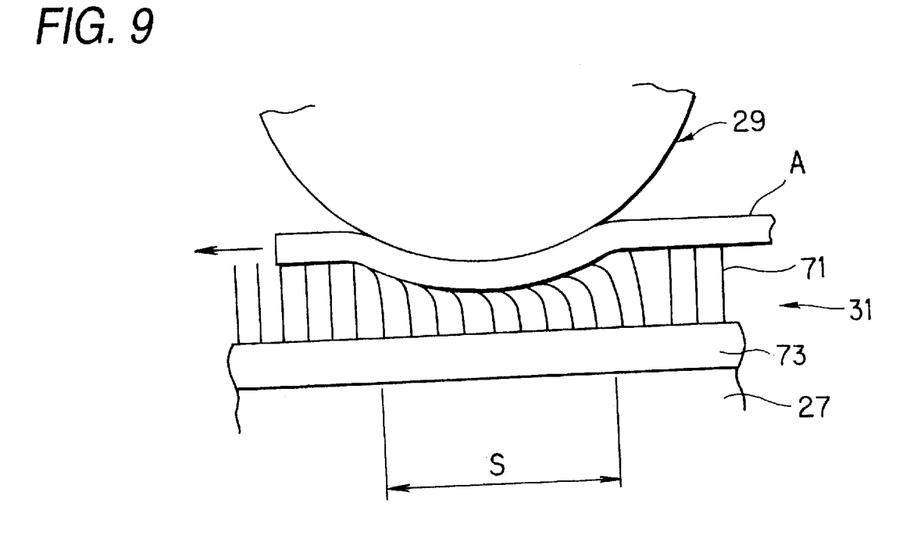
FIG. 9 is a diagram showing the cushion member deformed owing to insertion of a sheet according to the third embodiment.
Figure 10:
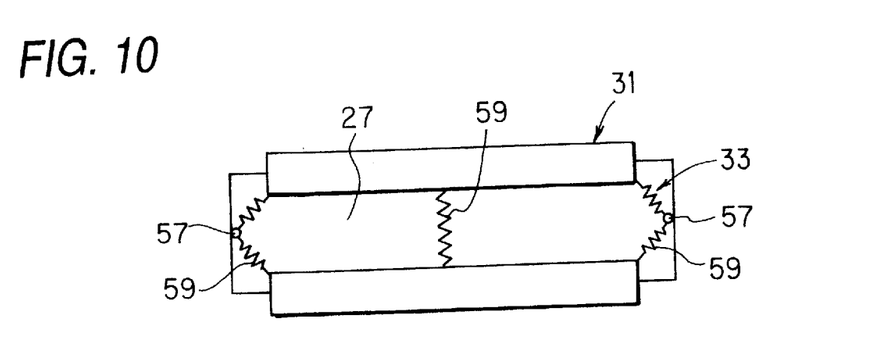
FIG. 10 is a bottom view showing the heat plate in which a pulling means is illustrated according to the third embodiment.
Figure 11:
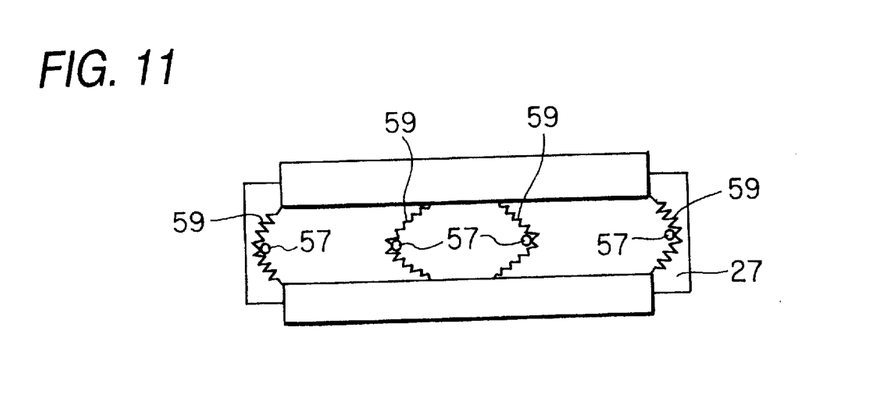
FIG. 11 is a bottom view showing the heat plate in which a modification of the pulling means is illustrated according to the third embodiment.
Figure 12:
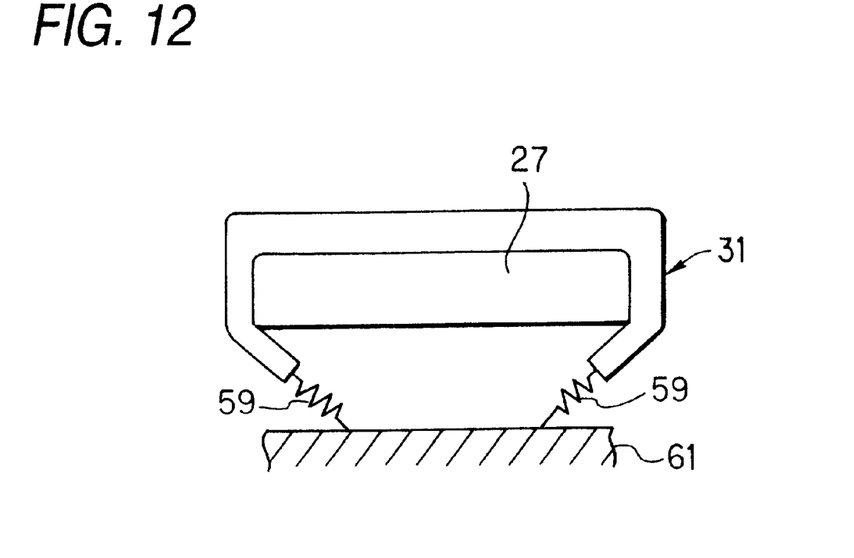
FIG. 12 is a front view showing the heat plate in which a modification of the pulling means is illustrated according to the third embodiment.

FIG. 8 is an enlarged view showing an essential portion of a cushion member according to the third embodiment, FIG. 9 is a diagram showing the cushion member deformed owing to insartion of a sheet. Further, FIG. 10 is a bottom view showing the heat plate in which a pulling means is illustrated, FIG. 11 is a bottom view showing the heat plate in which a modification of the pulling means is illustrated, and FIG. 12 is a front view showing the heat plate in which a modification of the pulling means is illustrated.

In the third embodiment, we will describe about the heat plate 27, the cushion member 31, the pulling means 33 and the sub-heating member 35 of the development portion II according to the first embodiment. The description of the same element as the first embodiment is omitted and the element is numbered the same reference as the first embodiment.

The cushion member 31 may be a fiber sheet constituted by gathering fine thread materials. The fibers sheet may be constituted by natural fibers or chemical fibers. The natural fibers may be vegetable fibers, animal fibers or mineral fibers. The chemical fibers may be regenerated fibers, semi-synthetic fibers, synthetic fibers or inorganic fibers. Note that the employed fibers must satisfy required degrees of low friction, heat resistance and elasticity. It is preferable that the requirements are such that elasticity is permitted at a temperature of about 120° C. which is the ambient temperature for the development portion II. Moreover, frictional resistance lower than that between the sheet A and the roller 29 is required.

Specifically, the fiber sheet is exemplified by a usual cloth, a Teflon brush, felt manufactured by contracting and fixing bristles by using the characteristic that the bristles are tangled; a towel consisting of piles each of which formed by projecting fold edge lines or fluffs from the base tissue of the cloth; corduroy; or velvet.

The material of the fiber sheet is exemplified by cellulose, aramide resin, fluorine resin, polyphenylene sulfide (PPS), polyimide (PI), polyamideimide (PAI), polyacetal (POM), polyether sulfone (PES), polyamide (PA), polycarbonate (PC), polystyrene (PS), vinyl chloride (PVC), acrylonitrile butadiene styrene (ABS), polyethylene (PE) and polyethylene terephthalate (PET).

The cushion member 31 may be constituted by sponge or a foamed material as a substitute for the fiber sheet. Hereinafter description of the second embodiment will be performed about the cushion member 31 which is constituted by a Teflon brush manufactured by napping brush bristles of the ground tissue. In the foregoing case, the length (the stable length) h of each of the brush bristles 71 is, for example, 2 mm to 5 mm, as shown in FIG. 8. The brush bristles 71 are woven such that separation from the base texture 73 can be prevented or the same are bonded. In this embodiment, the relationship between the position of the rollers 29 and the cushion member 31 is determined such that the lower portion of the rollers 29 is brought into contact with the leading end of the brush bristles 71 such that any gap does not occur between the rollers 29 and the brush bristles 71. That is, the sheet A is inserted such that the brush bristles 71 are caused to fall. The sheet A has a thickness of, for example, 120 mm.

When the sheet A has been introduced into a space between the roller 29 and the cushion member 31 which covers the surface. of the heat plate 27, the sheet A is pressed by the rollers 29, as shown in FIG. 9. Thus, a portion of the cushion member 31 is elastically deformed, causing deformation of the sheet A (circular-arc deformation along the contour of the rollers 29) to be permitted. Moreover, reaction from the brush bristles 51 is exerted on the sheet A. It leads to a fact that a tension is exerted on a portion (portion S which has been deformed) of the sheet A. As a result, change in the temperature causes the wrinkle which occurs in the sheet A to positively be smoothed down (that is, an effect similar to ironing can be obtained).

FIG. 10 is a plan view showing the heat plate 27 to which the cushion member 31 has been joined when the heat plate 27 is viewed from an arrow X shown in FIG. 2. A tension is exerted on the cushion member 31 from the pulling means 33. Specifically, support pins 57 are allowed to project over the two ends of the lower surface of the heat plate 27 in the conveying direction. The support pins 57 are disposed outer than the cushion member 31 in the sheet conveying direction. An end of the pulling spring 59 is secured to an end of each of the two side ends of the cushion member 31 in the sheet conveying direction. The other end of each pulling spring 59 is engaged to the support pin 57. The pulling spring 59 is arranged between the central portions of the two side ends of the cushion member 31 in the conveying direction. The pulling spring 59 is in a state where it is being pulled. Therefore, the cushion member 31 is brought to a state where a tension is always exerted because the cushion member 31 is pulled by the pulling spring 59. As a result, if the relative position between the heat plate 27 and the cushion member 31 is deviated owing to the difference in the coefficient of thermal expansion, occurrence of a wrinkle of the cushion member 31 can be prevented.

The tension of the pulling spring 59 is exerted in a direction in which no wrinkle is formed in the overall surface of the cushion member 31. When the support pins 57 are disposed on the outside of the cushion member 31 as shown in FIG. 10, the cushion member 31 can be pulled from the two sides of the sheet conveying direction. Thus, formation of a wrinkle can be prevented. As an alternative to this, a plurality of the pulling springs 59 each of which is arranged between the two sides ends of the cushion member 31 may be joined, as shown in FIG. 11. Also in the foregoing case, it is preferable that the support pins 57 are shifted to the two sides in the sheet conveying direction to exert the tension in directions in which the cushion member 31 is pulled from the two sides of the sheet conveying direction. The pulling spring 59 may have another end which is supported by a portion except for the heat plate 27, for example, a frame 61 of the heat treatment apparatus 1, as shown in FIG. 12.

It is preferable that the cushion members 31 joined to the heat plate 27 by arranging the pulling springs 59 are detachable from the heat plate 27. As a result, change to a new cushion member 31 permits the function for moderating the pressure of the rollers 29 which is exerted on the sheet A to permanently be maintained if fatigue, such as permanent strain of the brush bristles 71, of the cushion member 31 occurs.

The heat treatment apparatus 1 incorporates the cushion member 31 provided for the heat plate 27 thereof. Therefore, when the rollers 29 press the sheet A, the cushion member 31 is elastically deformed to permit deformation of the sheet A. Moreover, reaction from the cushion member 31 is exerted on the sheet A. Therefore, a partial tension is exerted on the sheet A. Hence it follows that a wrinkle of the sheet A owing to change in the temperature can positively be removed.

When the cushion member 31 incorporating the brush bristles 71 is employed, another effect can be obtained in that dust carried by the sheet A is removed to prevent damage.

If the roller 29 is changed (deformation of the roller 29) with time, uneven result of the process does not occur in a case where the amount of the change is smaller than the range of the elastic deformation of the cushion member 31.

Since deformation of the sheet A can be permitted by the cushion member 31, the elements are not required to have considerable accuracy. As a result, the cost of the apparatus can be reduced.

(Fourth Embodiment)

A fourth embodiment of the heat treatment apparatus according to the present invention will now be described.

Figure 13:
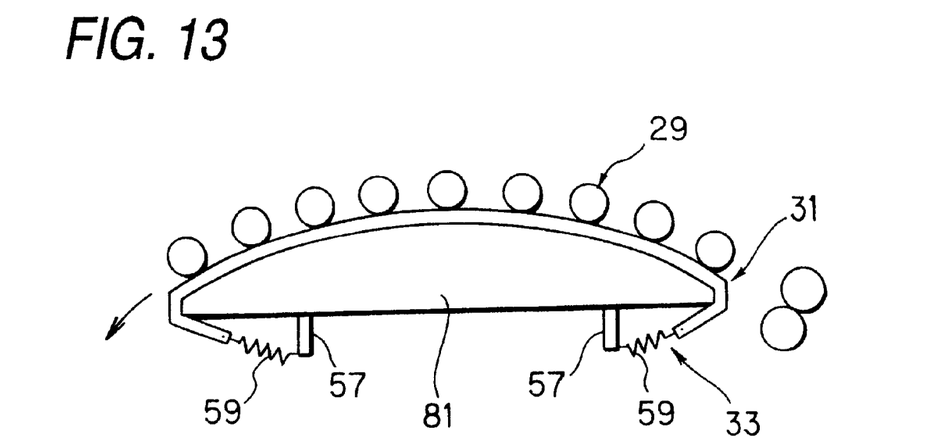
FIG. 13 is an enlarged view showing an essential portion of a development portion of the heat treatment apparatus according to the forth embodiment of the present invention.

FIG. 13 is an enlarged view showing an essential portion of the development portion according to the fourth embodiment.

In the third embodiment, the heat plate 27 is a flat plate and the sheet conveying printing is formed into a straight shape. In this embodiment, a heat plate 81 is formed into a quadric surface in the conveying direction so that the conveying passage is formed into a convex shape.

A plurality of rollers 29 similar to those of foregoing embodiment are disposed on the convex surface of the heat plate 81 in the conveying direction. A cushion member 31 similar to that of the foregoing embodiment and detachable from the pulling means 33 are joined to the upper surface of the heat plate 81. The other portions are similar to those of the development heat treatment apparatus 1 according to the third embodiment.

The heat treatment apparatus according to this embodiment has the heating surface of the heat plate 81 curved into the convex shape. Therefore, when the sheet A is pressed against the heat plate 81 by the rollers 29, the sheet A is bent along the heat plate 81 into the arc shape. Thus, easy occurrence of a wrinkle in the direction in which the sheet A is conveyed can be prevented. Moreover, a generated wrinkle can be smoothed. Hence it follows that uneven development can furthermore effectively be prevented.

As described above, the heat treatment apparatus according to the present invention incorporates the member, the temperature of which is measured and changed with the relationship with change in the moving means, is disposed adjacent to the moving means. Moreover, the temperature sensor is disposed in contact with the member, the temperature of which is measured. Therefore, the temperature sensor detects the temperature of the member, the temperature of which is measured. The detected temperature is corrected in accordance with the relationship detected previously. Hence it follows that the temperature of the moving means, which cannot be detected by the conventional technique, can be detected. As a result, accurate control of the temperature can be performed when the heating operation is restarted after the heating operation has been interrupted.

The member, the temperature of which is measured, incorporates the same element as that of the moving means. Therefore, change in the temperature of the member, the temperature of which is measured can be made to approximate change in the temperature of the moving means. As a result, the difference between the temperature obtained from the member, the temperature of which is measured, and the actual temperature of the moving means can be reduced. Hence it follows that the accuracy of the estimated temperature of the moving means can be improved.

As described above, the heat treatment apparatus according to the present invention has pressing/moving means of this heat treatment apparatus slides and moves the sheet on the surface of the heating member while pressing at least a portion of the sheet against the surface of said heating member, thus, the wrinkle which occurs in the sheet A is prevented.

Further, the heat treatment apparatus according to the present invention incorporates the cushion member which moderates the pressure which is exerted from the pressing/moving means on the sheet which must be subjected to the heat treatment. Therefore, when the pressing/moving means presses the sheet, the cushion member is elastically deformed. Thus, deformation of the sheet is permitted. Moreover, reaction from the cushion member is exerted on the sheet. Therefore, a partial tension can be exerted on the sheet. As a result, a wrinkle of the sheet occurring due to considerable change in the temperature can positively be removed. Therefore, even a large-area and thin sheet can uniformly be developed.

What is claimed is:

1. A heat treatment apparatus comprising:

a heating member which subjects a sheet to a heating process at a predetermined temperature;

moving means which moves the sheet;

a temperature-measured member, the temperature of which is measured, the measured temperature having a relationship with a temperature and a change in the temperature of said moving means, said temperature-measured member being disposed at a position adjacent to said moving means;

a temperature sensor disposed in contact with said temperature-measured member so as to effect the measuring of the temperature of said temperature-measured member; and temperature control means which controls the temperature of said moving means based on the temperature measured by said temperature sensor.

2. A heat treatment apparatus according to claim 1, wherein said moving means is structured by coating an outer surface of a roller material with a first elastic member having a predetermined thickness, wherein said temperature-measured member is structured by coating said temperature-measured member with a second elastic member made of the same material as the first elastic member with substantially the same thickness, and wherein said temperature sensor is disposed in contact with a surface of said second elastic member.

3. A heat treatment apparatus according to claim 1, wherein said heating member comprises a surface which subjects the sheet to the heating process; and wherein said moving means comprises a pressing/moving means which slides and moves the sheet on the surface of said heating member while pressing at least a portion of the sheet against the surface of said heating member.

4. A heat treatment apparatus according to claim 3, further comprising a cushion member disposed on said surface of said heating member and arranged to moderate pressure which is exerted from said pressing/moving means on said sheet.

5. A heat treatment apparatus according to claim 4, further comprising pulling means for giving a tension to said cushion member.

6. A heat treatment apparatus according to claim 4, wherein said cushion member is detachable from said heating member.

7. A heat treatment apparatus according to claim 4, wherein said cushion member comprises a fiber sheet having gathered fine thread materials.

8. A heat treatment apparatus according to claim 4, further comprising a sub-heating member disposed adjacent a side of said moving means opposite from a side of said moving means adjacent said heating member.

9. A heat treatment apparatus according to claim 1, further comprising a sub-heating member disposed adjacent a side of said moving means opposite from a side of said moving means adjacent said heating member.

10. A heat treatment apparatus comprising:

a heater operative to subject a sheet to a heating process at a predetermined temperature, the heater having a developing surface;

a plurality of rollers operative to move the sheet along the developing surface;

a dummy piece disposed adjacent the plurality of rollers, the dummy piece having a temperature correspondence relationship with the plurality of rollers;

a temperature sensor disposed in contact with the dummy piece and operative to measure the temperature of the dummy piece; and a temperature controller operative to control a temperature of the plurality of rollers based on the temperature measured by the temperature sensor.

11. A heat treatment apparatus according to claim 10, wherein the temperature controller controls the temperature of the plurality of rollers by supplying a first amount of heat to portions of the apparatus not subjected to a heat loss during the heat treatment and by supplying a second amount of heat to portions of the apparatus subjected to a heat loss during the heat treatment.

12. A heat treatment apparatus according to claim 11, wherein the second amount of heat is supplied to edge portions of the developing surface.

13. A heat treatment apparatus according to claim 10, wherein the rollers comprise an outer coating surface of a roller material having a predetermined thickness, wherein a portion of the dummy piece comprises the roller material, the portion having substantially the same thickness as the predetermined thickness, and wherein the temperature sensor is disposed in contact with a surface of the portion of the dummy piece.

14. A heat treatment apparatus according to claim 10, wherein the rollers are operative to slide and move the sheet on the developing surface while pressing at least a portion of the sheet against the developing surface.

15. A heat treatment apparatus according to claim 10, further comprising a cushion disposed on the developing surface and arranged to moderate pressure which is exerted by the rollers on the sheet.

16. A heat treatment apparatus according to claim 15, further comprising a pulling mechanism operative to give a tension to the cushion.

17. A heat treatment apparatus according to claim 4, wherein the cushion is detachable from the heater.

18. A heat treatment apparatus according to claim 15, wherein the cushion comprises a fiber sheet having gathered fine thread materials.

19. A heat treatment apparatus according to claim 15, wherein the rollers have a higher coefficient of friction than the a surface of the cushion that faces the rollers.

20. A heat treatment apparatus according to claim 10, further comprising a sub-heater disposed adjacent a side of the rollers opposite from a side of the rollers adjacent the heater, the sub-heater being controlled by the temperature controller and operative to provide a portion of a total heat to which the sheet is subjected, wherein a remainder of the total heat is provided by the heater.

* * * * *